United States Patent
Suzuki et al.

(10) Patent No.: US 6,398,682 B1
(45) Date of Patent: Jun. 4, 2002

(54) HYDRAULIC TENSIONER WITH RELIEF VALVE

(75) Inventors: Tadasu Suzuki; Nobuyuki Fujimoto, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/604,520

(22) Filed: Jun. 27, 2000

(30) Foreign Application Priority Data

Jun. 30, 1999 (JP) .......................................... 11-186448

(51) Int. Cl.[7] ................................................ F16H 7/08
(52) U.S. Cl. ..................................................... 474/110
(58) Field of Search ................................ 474/109, 110, 474/101, 112, 135

(56) References Cited

U.S. PATENT DOCUMENTS 4,874,352 A * 10/1989 Suzuki ........................ 474/110
5,879,256 A 3/1999 Tada

FOREIGN PATENT DOCUMENTS

EP 0483564 A1 * 6/1992
EP 0952375 A2 * 10/1999

* cited by examiner

*Primary Examiner*—Charles A Marmor
*Assistant Examiner*—Ankur Parekh
(74) *Attorney, Agent, or Firm*—Dann, Dorfman, Herrell and Skillman; Henry H. Skillman (57) ABSTRACT

A hydraulic tensioner includes a relief valve provided at a projecting end portion of a plunger. The relief valve has a pressure path communicating with a high pressure oil chamber, a valve body fitted for sliding movement in the pressure path, a spring for normally biasing the valve toward the high pressure oil chamber, and an outlet port communicating, when the valve body is moved back against the force of the spring, with the pressure path. The valve body is formed as a unitary member including a slidably movable portion fitted for sliding movement in the pressure path and acted upon by a hydraulic pressure of the high pressure oil chamber, and a flange portion having a cross sectional area greater than that of the slidably movable portion for being acted upon by the force of the spring.

1 Claim, 5 Drawing Sheets

HYDRAULIC TENSIONER WITH RELIEF VALVE

BACKGROUND OF THE INVENTION

1. Field of the Invention

This invention relates to a hydraulic tensioner with a relief valve for use to apply an appropriate tension to a timing belt, a timing chain or a like member of an engine for a vehicle.

2. Description of the Related Art

As a hydraulic tensioner for use to apply an appropriate tension to a timing belt, a timing chain or a like member of an engine for a vehicle, a hydraulic tensioner with a relief valve or with an orifice is frequently used in order to eliminate an excessive tension when it acts upon the timing belt, timing chain or like member.

Figure 5:
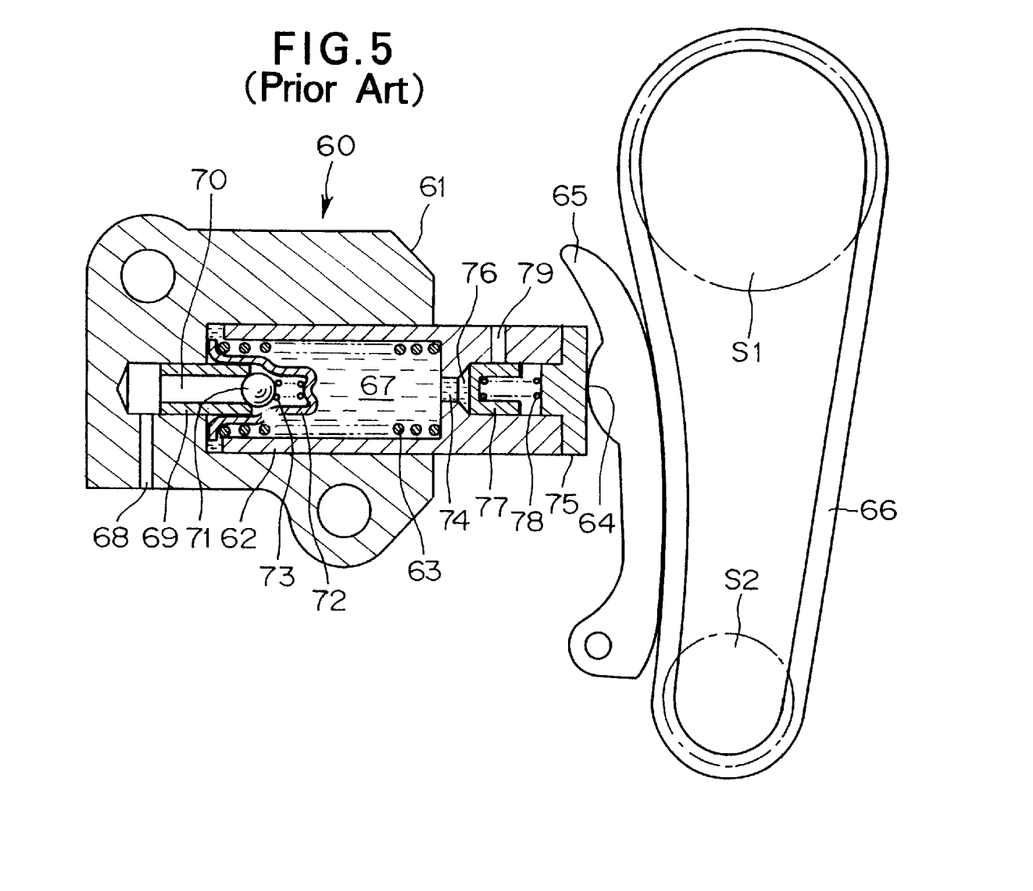
FIG. 5 is a schematic sectional view showing a conventional hydraulic tensioner with a relief valve.

A hydraulic tensioner with a relief valve is disclosed in Japanese Utility Model Laid-Open Publication No. HEI-3-12995. FIG. 5 is a schematic sectional view showing the hydraulic tensioner with a relief valve disclosed in the Japanese Publication just mentioned. Referring to FIG. 5, the hydraulic tensioner 60 with a relief valve shown includes a housing 61, a cylindrical plunger 62 mounted for sliding movement in the housing 61 and having an opening at one end thereof, and a spring 63 fitted in the inside of the plunger 62 and extending between the housing 61 and the plunger 62 for biasing the plunger 62 in a direction in which the plunger 62 projects from the housing 61 so that an outer end face 64 of the plunger 62 is resiliently pressed against a tensioner lever 65 to apply a tension to a chain 66 through the tensioner lever 65.

The housing 61 has an oil path 68 formed therein for supplying oil from a hydraulic pressure source such as an oil pump not shown into an oil chamber 67 in the inside of the plunger 62. Also a ball seat 69 has an oil path 70 formed therein for communicating the oil path 68 of the housing 61 and the oil chamber 67 with each other. A check ball 71 is biased toward the ball seat 69 by a coil spring 73 having one end contacting with a retainer 72. The ball seat 69, check ball 71, retainer 72 and coil spring 73 cooperatively form a check valve. The check valve permits oil from flowing from the oil path 70 into the oil chamber 67 but prevents the oil from flowing out from the oil chamber 67 to the oil path 70.

The plunger 62 has an oil path 74 which communicates with the oil chamber 67, and a sub oil chamber 76 which communicates with the oil chamber 67 through the oil path 74 and is formed from a plug 75 which closes up the other end of the plunger 62. A sleeve 77 is fitted for sliding movement in contact with an inner face of the sub oil chamber 76. Also a spring 78 is fitted in the sub oil chamber 76 between the sleeve 77 and the plug 75 for biasing the sleeve 77 so that the sleeve 77 may be pushed into the sub oil chamber 76. The plunger 62 further has an outlet port 79 formed radially therein. The outlet port 79 is communicated with the sub oil chamber 76 when the sleeve 77 is pushed back in a direction against the biasing force of the spring 78 by a hydraulic load applied in the oil chamber 67. Thus, the elements mentioned form a relief valve.

In the conventional hydraulic tensioner 60 with a relief valve, if slackening of the chain 66 occurs while the engine is operating, then the plunger 62 is allowed to be projected by the biasing force of the spring 63. Thereupon, the check ball 71 is simultaneously spaced away from the ball seat 69 to allow oil to be supplied into the oil chamber 67 through the oil path 68 of the housing 61 and the oil path 70 of the ball seat 69. Consequently, the tension of the chain 66 is maintained by the oil thus supplied to the oil chamber 67.

On the other hand, if an excessively high tension is applied to the chain 66 by an increase of the distance between the axes of sprocket wheels S1 and S2 or the like which arises from heat of the engine, then the plunger 62 is acted upon by a pressing load in the direction opposite to the biasing direction to the plunger 62 from the tensioner lever 65. Thereupon, the check valve acts to prevent the oil in the oil chamber 67 from flowing out. Consequently, the oil in the oil chamber 67, which is non-compressible fluid, prevents backward movement of the plunger 62. However, the sleeve 77 of the sub oil chamber 76 is acted upon by a hydraulic pressure generated in the oil chamber 67 so that it is slidably moved in the direction opposite to the biasing direction of the spring 78 to allow the oil from the oil chamber 67 into the sub oil chamber 76 to allow the plunger 62 to move back a little thereby to absorb the excessive tension acting upon the chain 66. If the pressing load to the plunger 62 further increases to retract the sleeve 77, then the sub oil chamber 76 and the outlet port 79 are communicated with each other thereby to open the check valve to allow the oil of the oil chamber 67 and the sub oil chamber 76 to be discharged through the outlet port 79 to allow the plunger 62 to move back a comparatively great amount thereby to eliminate the excessive tension of the chain 66. As the hydraulic pressure drops as a result of the discharge of the oil, the sleeve 77 is moved by the biasing force of the spring 78 until it closes up the outlet port 79 so that the oil chamber 67 may thereafter be kept in a fixed pressure condition. However, if the hydraulic pressure drops excessively, then the check valve operates to allow the oil to flow into the oil chamber 67 from the hydraulic source thereby to return the hydraulic pressure in the oil chamber 67 to its ordinary level.

Figure 6:
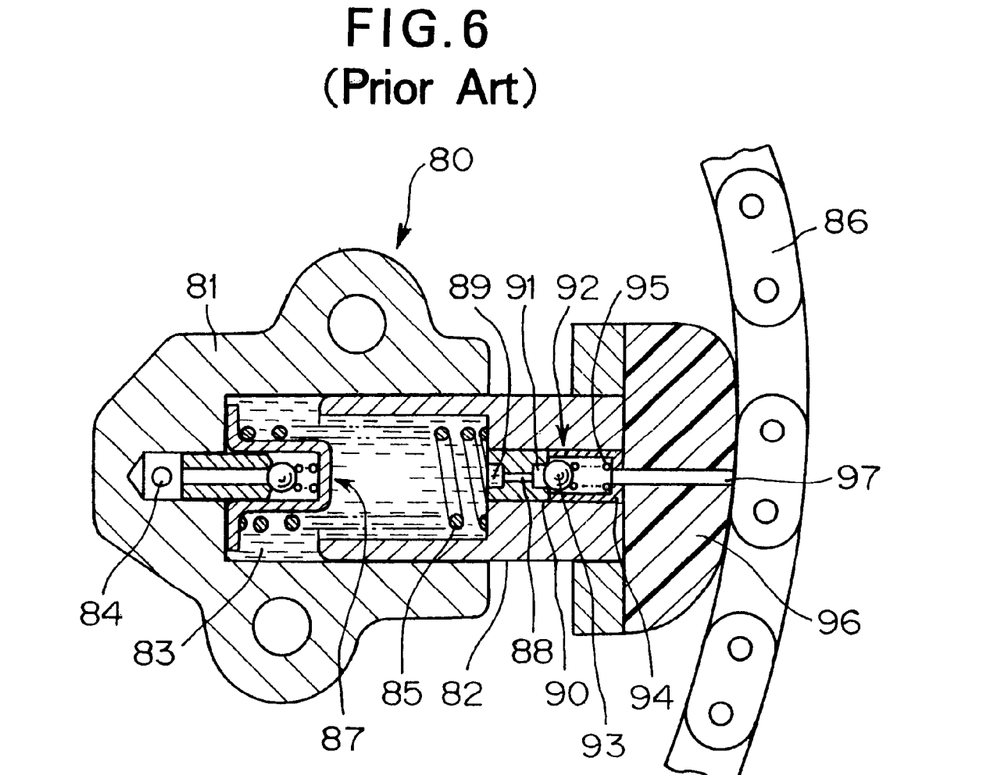
FIG. 6 is a similar view but showing a conventional hydraulic tensioner with an orifice.

Meanwhile, another conventional hydraulic tensioner with a orifice is disclosed in Japanese Utility Model Laid-Open Publication No. HEI-3-12043. FIG. 6 is a schematic sectional view showing the hydraulic tensioner with an orifice disclosed in the Japanese Publication just mentioned. Referring to FIG. 6, the hydraulic tensioner with an orifice is generally denoted at 80 and includes a housing 81, and a cylindrical plunger 82 mounted for sliding movement in the housing 81 and having an opening formed at one end thereof. An oil chamber 83 is defined by and between the housing 81 and the plunger 82.

The housing 81 has an oil path 84 formed therein for supplying oil from a hydraulic source such as an oil pump not shown to the oil chamber 83. A spring 85 is fitted in the plunger 82 and extends between the housing 81 and the plunger 82. The plunger 82 is acted upon by a projecting force provided by a hydraulic pressure from the hydraulic source and a biasing force of the spring 85, and applies a tension to a chain 86 under the projecting force mentioned.

A check valve 87 is interposed between the oil path 84 and the oil chamber 83 for permitting oil to flow from the oil path 84 into the oil chamber 83 but preventing the oil to flow backwardly from the oil chamber 83 to the oil path 84. Accordingly, oil having entered the oil chamber 83 cannot flow out from the oil chamber 83 thereby to prevent backward or retraction movement of the plunger 82. An orifice 88 is provided to permit such slow backward or retraction movement of the plunger 82 and exhibits its effect when the tension of the chain 86 becomes excessively high.

The orifice 88 is provided in the plunger 82. In particular, a plug 90 is mounted in a hole 89 perforated at an end of the plunger 82, and the orifice 88 is provided in the plug 90. A check valve 92 is formed at an outward opening 91 of the plug 90 for permitting oil from flowing out through the orifice 88 but preventing admission of air into the orifice 88 from the outside. The check valve 92 includes a check ball 93 positioned in the outward opening 91, a retainer 94, and a spring 95 for biasing the check ball 93 into the outward opening 91. An oil path 97 is formed in a tensioner lever 96, and oil discharged through the orifice 88 flows out from the oil path 97.

In the conventional hydraulic tensioner 80 with an orifice having such a construction as described above, oil having flowed into the oil chamber 83 cannot flow out rapidly from the oil chamber 83 due to an action of the check valve 87 between the oil path 84 and the oil chamber 83 and an action of the orifice 88. However, when a high hydraulic pressure applies continuously to the oil, the orifice 88 permits the oil to flow out slowly therethrough. Due to the actions, even if the tension to the chain 86 increases suddenly, it can be returned to an appropriate tension.

On the other hand, if the tension to the chain 86 drops, then the plunger 82 tends to project. If a projecting phenomenon of the plunger 82 occurs when sufficient pressure oil is not supplied into the oil chamber 83 because of a drop in functioning of the oil pump, choking up of the oil filer or the like immediately after the engine is started, then the oil chamber 83 is placed into a negative pressure condition. Accordingly, the oil tries to enter the oil chamber 83 through the check valve 92. However, since supply of oil is insufficient, the negative pressure is transmitted to the outward opening 91. However, since the check valve 92 is provided in the outward opening 91, the check valve 92 is closed and the admission path for air is closed up. Even when oil is not supplied sufficiently in this manner, air is prevented from entering the oil chamber 83.

In the conventional hydraulic tensioner 60 with a relief valve described with reference to FIG. 5, since the sleeve 77 which is one of components of the relief valve generally has a glass-like shape, it has a large area over which it is acted upon by a hydraulic pressure. Accordingly, the spring 78 for biasing the sleeve 77 in the direction in which the sleeve 77 is pushed in must have a great spring force. However, the space in which the spring 78 is accommodated is limited. Consequently, the hydraulic tensioner 60 with a relief valve is disadvantageous in that an excessively high stress acts upon the spring 78 in the limited space and is liable to break the spring 78.

The hydraulic tensioner 60 with a relief valve is disadvantageous also in that, since the sleeve 77 itself has a great mass, it is low in responsibility in a high frequency region because of the inertia of the sleeve 77 itself.

Meanwhile, in the conventional hydraulic tensioner 80 with an orifice described hereinabove with reference to FIG. 6, the check valve 92 is provided adjacent the orifice 88 and includes the check ball 93. Accordingly, the check valve 92 has a function of preventing admission of air from the outside when the inside of the oil chamber 83 is put into a negative pressure condition. However, since the check valve 92 includes the check ball 93, the hydraulic tensioner 80 with an orifice is disadvantageous in that, if the check ball 93 is moved even a little by an influence of vibrations of the engine, oil in the oil chamber 83 leaks through the check valve 92.

SUMMARY OF THE INVENTION

It is an object of the present invention to provide a hydraulic tensioner with a relief valve wherein a force to be applied to a valve body of the relief valve from pressure oil can be reduced to reduce the stress to be applied to a spring for biasing the valve body thereby to augment the degree of freedom in designing of the relief valve.

In order to attain the object described above, according to the present invention, there is provided a hydraulic tensioner with a relief valve, comprising a housing, a plunger fitted for sliding movement in the housing, a first spring for biasing the plunger in a projecting direction in which the plunger projects outwardly from the housing, a high pressure oil chamber formed between the housing and the plunger, a check valve interposed between the housing and the high pressure oil chamber for permitting oil to flow into the high pressure oil chamber from the outside of the housing but preventing the oil from flowing out from the high pressure oil chamber, and a relief valve provided at a projecting end portion of the plunger. The relief valve has a pressure path communicating with the high pressure oil chamber, a valve body fitted for sliding movement in the pressure path, a second spring for normally biasing the valve body toward the high pressure oil chamber, and an outlet port for communicating, when the valve body is moved back against the biasing force of the second spring, with the pressure path to allow the oil to flow to the outside therethrough. The valve body is formed as a unitary member including a slidably movable portion fitted for sliding movement in the pressure path and acted upon by a hydraulic pressure of the high pressure oil chamber, and a flange portion having a cross sectional area greater than that of the slidably movable portion for being acted upon by the biasing force of the second spring.

In the hydraulic tensioner with a relief valve, the valve body of the relief valve is formed as a unitary member including a slidably movable portion fitted for sliding movement in the pressure path and acted upon by a hydraulic pressure of the high pressure oil chamber, and a flange portion having a cross sectional area greater than that of the slidably movable portion for being acted upon by the biasing force of the second spring. Consequently, the slidably movable portion of the valve body can be formed with a comparatively small cross sectional area, and consequently, the end face of the slidably movable portion is acted upon by a comparatively low force from a hydraulic pressure generated in the high pressure oil chamber. Accordingly, also the biasing force of the second spring which matches with the force applied to the end face of the slidably movable portion can be set to a comparatively low level. As a result, a spring having a comparatively low biasing force can be used for the second spring, and setting of a relief point within a limited space and at a high pressure can be anticipated.

Further, since the valve body of the relief valve is formed in such a manner as described above, the valve body itself can be made lighter in weight than ever, and this eliminates such a trouble that the valve body is opened by an inertial force of the valve body itself by high frequency vibrations of the entire apparatus.

Due to the advantages described above, the degree of freedom in designing a relief valve is augmented.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
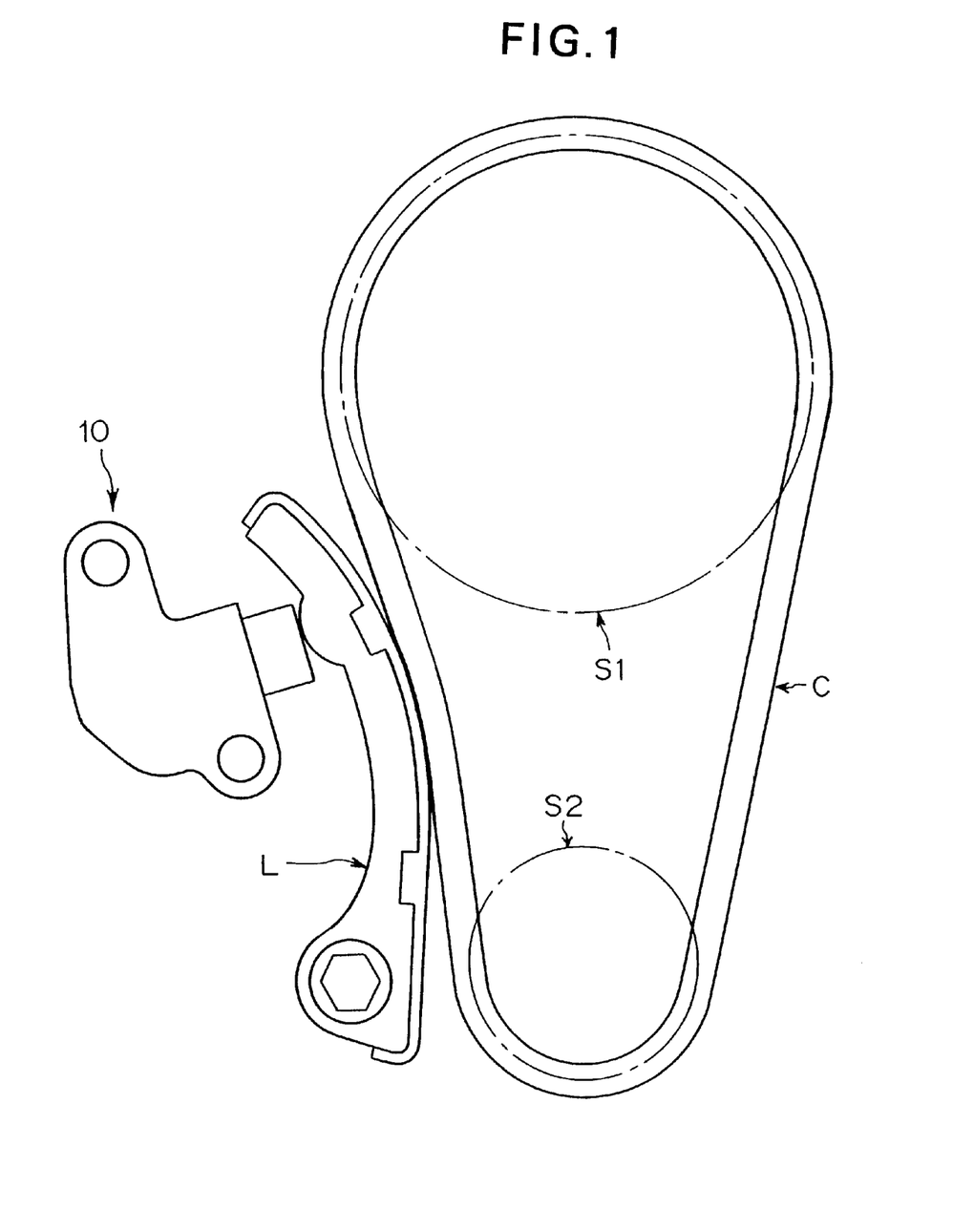
FIG. 1 is a schematic view showing a hydraulic tensioner with a relief valve to which the present invention is applied.
Figure 2:
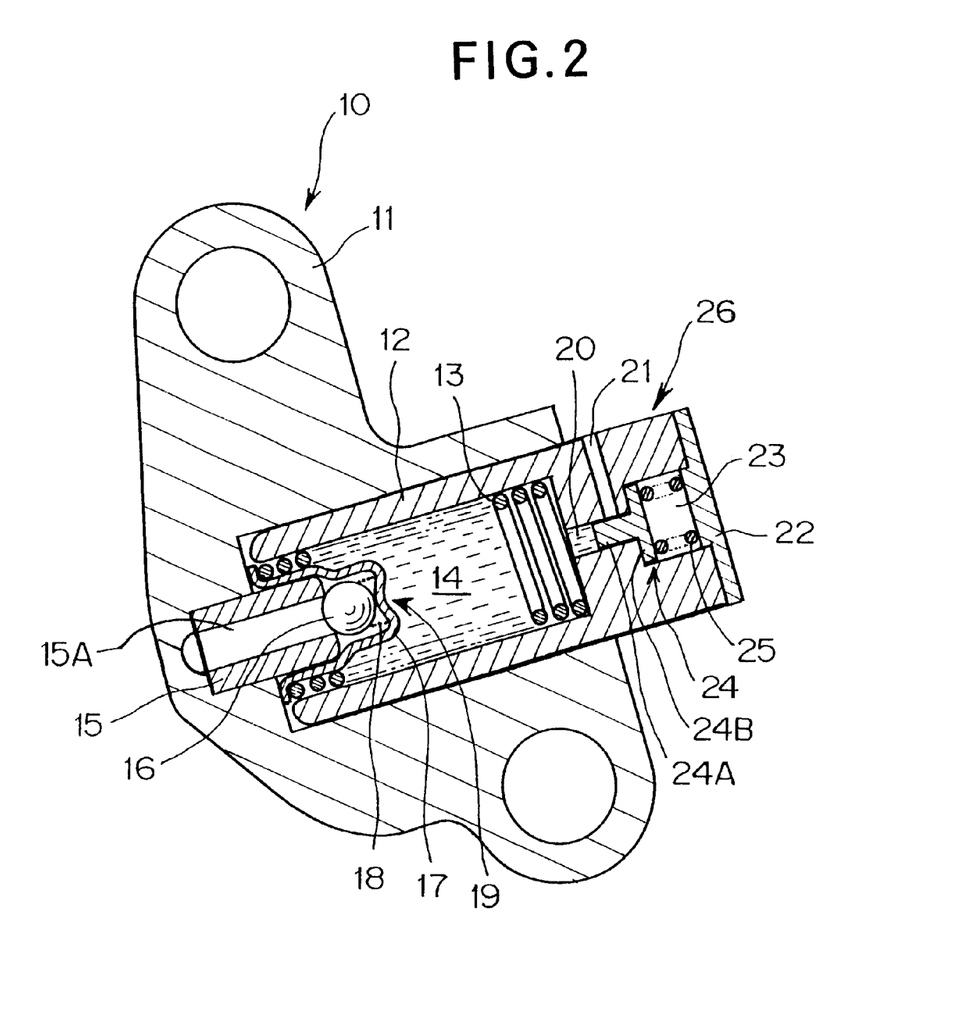
FIG. 2 is an enlarged sectional view of the hydraulic tensioner with a relief valve of FIG. 1.

Referring to FIGS. 1 and 2, there is shown a hydraulic tensioner with a relief valve to which the present invention is applied.

The hydraulic tensioner with a relieve valve shown is generally denoted at 10 and includes a housing 11 and a cylindrical plunger 12 fitted for sliding movement in the housing 11 and having an opening at one end thereof. A spring 13 is fitted in the plunger 12 between the plunger 12 and the housing 11 for normally biasing the plunger 12 in a projecting direction in which the plunger 12 projects from the housing 11. An end face of the plunger 12 is pressed against a tensioner lever L under the biasing force of the spring 13 to apply a tension to a chain C through the tensioner lever L.

The housing 11 has an oil path (not shown) formed therein for supplying oil from a hydraulic source such as an oil pump not shown to a high pressure oil chamber 14 formed in the plunger 12. Also a ball seat 15 has an oil path 15A formed therein for communicating the oil path (not shown) of the housing 11 with the high pressure oil chamber 14. A check ball 16 is normally biased toward the ball seat 15 by a spring 18 having an end contacting with a retainer 17. The ball seat 15, check ball 16, retainer 17 and spring 18 cooperatively form a check valve 19. The check valve 19 permits oil to flow from the oil path 15A into the high pressure oil chamber 14 but prevents the oil to flow reversely from the high pressure oil chamber 14 into the oil path 15A.

The plunger 12 has formed therein a pressure path 20 which communicates with the high pressure oil chamber 14, an outlet port 21 which communicates at one end thereof to the pressure path 20 and is open at the other end thereof to the outside, and an spring accommodation chamber 23 which communicates with the high pressure oil chamber 14 through the pressure path 20 and is defined by a plug 22 which closes up an end portion of the plunger 12. A portion (flanged portion 24B which is hereinafter described) of a valve body 24 and a spring 25 for applying a biasing force to the valve body 24 are accommodated in the spring accommodation chamber 23. The valve body 24 is formed as a unitary member from a slidably movable portion 24A which is fitted for sliding movement in the pressure path 20 and is acted upon by a hydraulic pressure of the high pressure oil chamber 14, and a flanged portion 24B which has a greater cross sectional area than that of the slidably movable portion 24A and is acted upon by the biasing force of the spring 25. A relief valve 26 is formed from the pressure path 20, outlet port 21, valve body 24 and spring 25.

In the hydraulic tensioner 10 with a relief valve described above, if the chain C becomes slackened while the engine is operating, then the plunger 12 is projected by the biasing force of the spring 13 while the check ball 16 is simultaneously spaced away from the ball seat 15 thereby to allow oil to be supplied from the hydraulic source (not shown) into the high pressure oil chamber 14 through the oil path (not shown) of the housing 11 and the oil path 15A of the ball seat 15 thereby to maintain the tension of the chain C.

If an excessively high tension is applied to the chain C due to an increase of the distance between the axes of sprocket wheels S1 and S2 which arises from heat of the engine, then the plunger 12 is acted upon by a pressing load in a direction reverse to the biasing direction from the tensioner lever L. Thereupon, the check valve 19 acts to prevent oil in the high pressure oil chamber 14 from flowing out from the high pressure oil chamber 14, and the oil in the high pressure oil chamber 14 which is non-compressible fluid prevents backward movement of the plunger 12. However, the valve body 24 is acted upon at the end face of the slidably movable portion 24A thereof by a hydraulic pressure generated in the high pressure oil chamber 14 so that it is slidably moved in the direction opposite to the biasing direction of the spring 25 to allow the oil from the oil chamber 14 into the pressure path 20 to allow the plunger 12 to move back a little thereby to absorb the excessive tension acting upon the chain C. As the pressing load to the plunger 12 further increases to retract the valve body 24, then the pressure path 20 and the outlet port 21 are brought into communication with each other so that the oil in the high pressure oil chamber 14 is permitted to flow out from the high pressure oil chamber 14. Consequently, the plunger 12 is allowed to move back a comparatively great amount thereby to eliminate the excessive tension of the chain C. When the hydraulic pressure decreases as a result of the discharge of the oil, the valve body 24 is moved by the biasing force of the spring 25 until it closes up the outlet port 21 so that the high pressure oil chamber 14 may thereafter be maintained in a predetermined pressure. However, if the hydraulic pressure decreases excessively, then the check valve 19 operates to allow oil to flow from the hydraulic source not shown into the high pressure oil chamber 14 thereby to restore the predetermined hydraulic pressure.

Since the hydraulic tensioner 10 with a relief valve described above with reference to FIGS. 1 and 2 has such a construction as described above, the slidably movable portion 24A of the valve body 24 can be formed with a comparatively small sectional area, and the force applied to the end face of the slidably movable portion 24A from a hydraulic pressure generated in the high pressure oil chamber 14 is comparatively low. Accordingly, also the biasing force of the spring 25 which matches with the force acting upon the end face of the slidably movable portion 24A may be comparatively small. As a result, a spring having a comparatively low biasing force can be used as the spring 25. Further, setting of a relief point within a limited space and at a high pressure can be anticipated.

Further, the valve body 24 itself can be made lighter in weight than ever, and this eliminates such a trouble that the valve body 24 is opened by an inertial force of the valve body 24 itself by high frequency vibrations of the entire apparatus.

Figure 3:
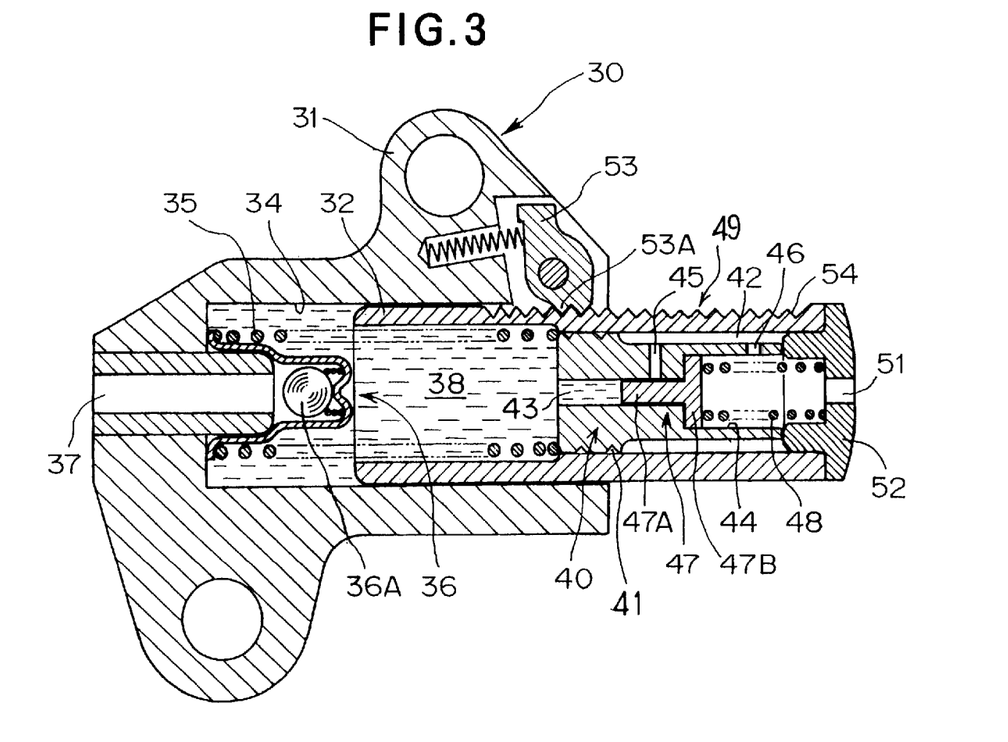
FIG. 3 is a similar sectional view but showing another hydraulic tensioner with a relief valve to which the present invention is applied.

Referring now to FIG. 3, there is shown another hydraulic tensioner with a relief valve to which the present invention is applied. The hydraulic tensioner with a relief valve shown is generally denoted at 30 and cooperates, similarly to the hydraulic tensioner 10 with a relief valve described hereinabove with reference to FIG. 2, with the tensioner lever L for the chain C described hereinabove with reference to FIG. 1.

Referring also to FIG. 3, the hydraulic tensioner 30 with a relief valve shown includes a housing 31 having an acommodation hole 34 formed therein. A plunger 32 is fitted for sliding movement in the accommodation hole 34 and is normally biased by a plunger spring 35 provided in the accommodation hole 34 such that one end portion of the plunger 32 is projected outwardly of the housing 31. An end face of the plunger 32 presses under the biasing force of the plunger spring 35 against the tensioner lever L to apply a tension to the chain C.

A check valve 36 including a check ball 36A is provided on the bottom of the accommodation hole 34. The check valve 36 permits oil to flow into the accommodation hole 34 from a supply oil path 37 formed in the housing 31 but prevents the oil from flowing out from the accommodation hole 34 into the supply oil path 37. A high pressure oil chamber 38 for oil supplied from the supply oil path 37 is formed from the inside of the plunger 32 and the housing 31.

A substantially cylindrical member 40 is force fitted in and secured to the inside of an end portion of the plunger 32 adjacent the tensioner lever L. An orifice and a relief valve which are hereinafter described are incorporated in the substantially cylindrical member 40.

Figure 4:
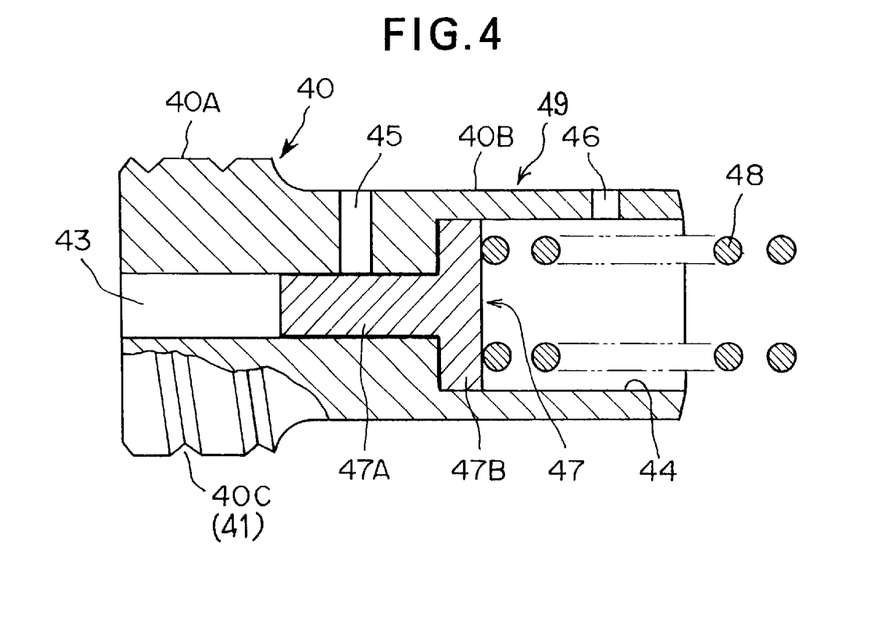
FIG. 4 is an enlarged sectional view of part of the hydraulic tensioner with a relief valve of FIG. 3.

FIG. 4 shows part of the hydraulic tensioner 30 with a relief valve in an enlarged scale. Referring to FIG. 4, the substantially cylindrical member 40 has a large diameter portion 40A and a small diameter portion 40B. A spiral groove 40C is formed on an outer periphery of the large diameter portion 40A. The spiral groove 40C cooperates with an inner circumferential face of the plunger 32, in and to which the substantially cylindrical member 40 is force fitted and secured, to form an orifice 41. Further, a gap 42 is defined between an outer periphery of the small diameter portion 40B and the inner circumferential face of the plunger 32 in a condition wherein the substantially cylindrical member 40 is force fitted in and secured to the inside of the plunger 32.

The substantially cylindrical member 40 has a pressure path 43 and a spring accommodation chamber 44, which is hereinafter described, formed at central portions thereof. The pressure path 43 communicates with the high pressure oil chamber 38. The substantially cylindrical member 40 further has an outlet port 45 formed in a radial direction thereof. The outlet port 45 communicates at one end thereof with the pressure path 43 and is opened at the other end thereof to the outside. The substantially cylindrical member 40 further has an oil path 46 formed in a radial direction thereof. The oil path 46 communicates at one end thereof with the spring accommodation chamber 44 and is opened at the other end thereof to the outside.

As seen from FIGS. 3 and 4, a portion (a flanged portion 47B which is hereinafter described) of a valve body 47 and a spring 48 for providing a biasing force to the valve body 47 are accommodated in the spring accommodation chamber 44. The valve body 47 is formed as a unitary member from a slidably movable portion 47A which is fitted for sliding movement in the pressure path 43 and is acted upon by a hydraulic pressure of the high pressure oil chamber 38, and a flanged portion 47B having a cross sectional area greater than that of the slidably movable portion 47A and acted upon by the biasing force of the spring 48. The pressure path 43, outlet port 45, valve body 47 and spring 48 cooperatively form a relief valve 49.

Further, a plug 52 having a discharge opening 51 for allowing oil of an oil reservoir chamber (formed by the spring accommodation chamber 44) to be discharged therethrough is provided at an end of the plunger 32.

It is to be noted that, although the hydraulic tensioner 30 with a relief valve which includes a retraction prevention mechanism for the plunger 32 wherein a pawl 53A of a ratchet 53 mounted on the housing 31 meshes with a rack 54 is shown in FIG. 3, such a mechanism as just described need not necessarily be provided.

The hydraulic tensioner 30 with a relief valve having the construction described above operates in the following manner.

If the plunger 32 of the hydraulic tensioner 30 with a relief valve is acted upon by an impact, a load or the like in the direction opposite to the biasing direction of the plunger spring 35 from the chain C, then since the check valve 36 prevents oil flowing out from the high pressure oil chamber 38 back into the supply oil path 37, the hydraulic pressure in the high pressure oil chamber 38 rises. In this instance, since air or oil leaks from the orifice 41 formed from the spiral groove 40C, the impact upon the plunger 32 is moderated. Simultaneously, the hydraulic pressure of the high pressure oil chamber 38 is applied to the end face of the slidably movable portion 47A of the valve body 47 through the pressure path 43. When the hydraulic pressure becomes higher than the biasing force of the spring 48 acting upon the end face of the flanged portion 47B, the valve body 47 is moved back gradually. As the hydraulic pressure in the high pressure oil chamber 38 further rises, the valve body 47 is further moved back until the outlet port 45 is communicated with the pressure path 43. Consequently, the oil in the high pressure oil chamber 38 flows out into the gap 42 through the pressure path 43 and the outlet port 45 so that the excessive hydraulic pressure in the high pressure oil chamber 38 is eliminated. Further, the oil leaking from the orifice 41 and the oil flowing out from the outlet port 45 flow through the gap 42 past the oil path 46 into the spring accommodation chamber 44 (which serves also as the reservoir chamber). Then, the oil is discharged from the discharge opening 51 to the outside of the plunger 32 to lubricate the chain C.

Since the hydraulic tensioner 30 with a relief valve has such a construction as described above, the slidably movable portion 47A of the valve body 47 can be formed with a comparatively small cross sectional area, and consequently, the end face of the slidably movable portion 47A is acted upon by a comparatively low force from a hydraulic pressure generated in the high pressure oil chamber 14. Accordingly, also the biasing force of the spring 48 which matches with the force applied to the end face of the slidably movable portion 47A from a hydraulic pressure generated in the high pressure oil chamber 14 can be set to a comparatively low level. As a result, a spring having a comparatively low biasing force can be used for the spring 48, and setting of a relief point within a limited space and at a high pressure can be anticipated.

Further, the valve body 47 itself can be made lighter in weight than ever, and this eliminates such a trouble that the valve body 47 is opened by an inertial force of the valve body 47 itself by high frequency vibrations of the entire apparatus.

While preferred embodiments of the present invention have been described using specific terms, such description is for illustrative purposes only, and it is to be understood that changes and variations may be made without departing from the spirit or scope of the following claims.

What is claimed is:

1. A hydraulic tensioner with a relief valve, comprising:
   a housing;
   a plunger fitted for sliding movement in said housing;
   a first spring for biasing said plunger in a projecting direction in which said plunger projects outwardly from said housing;
   a high pressure oil chamber formed between said housing and said plunger;
   a check valve interposed between said housing and said high pressure oil chamber for permitting oil to flow into said high pressure oil chamber from the outside of said housing but preventing the oil from flowing out from said high pressure oil chamber; and a relief valve provided at a projecting end portion of said plunger, wherein said relief valve has a pressure path communicating with said high pressure oil chamber, a valve body fitted for sliding movement in said pressure path, a second spring for normally biasing said valve body toward said high pressure oil chamber, and an outlet port for communicating, when said valve body is moved back against the biasing force of said second spring, with said pressure path to allow the oil to flow to the outside therethrough, wherein said outlet port branches out from said pressure path, and wherein said valve body is formed as a unitary member including a slidably movable portion fitted for sliding movement in said pressure path and acted upon by a hydraulic pressure of said high pressure oil chamber, and a flange portion having a cross sectional area greater than that of said slidably movable portion for being acted upon by the biasing force of said second spring.

\* \* \* \* \*